(12) United States Patent
Heim et al.

(10) Patent No.: US 8,678,175 B2
(45) Date of Patent: Mar. 25, 2014

(54) DEVICE FOR CHANNELING OUT CONTAINERS

(75) Inventors: Ralf Heim, Laupheim (DE); Joachim Noe, Ehingen (DE)

(73) Assignee: Uhlmann Pac-Systeme GmbH & Co. KG., Laupheim (DE)

( * ) Notice: Subject to any disclaimer, the term of this patent is extended or adjusted under 35 U.S.C. 154(b) by 64 days.

(21) Appl. No.: 13/369,769

(22) Filed: Feb. 9, 2012

(65) Prior Publication Data

US 2012/0222939 A1 Sep. 6, 2012

(30) Foreign Application Priority Data

Mar. 4, 2011 (EP) .................................... 11157029

(51) Int. Cl.
*B65G 21/12* (2006.01)
*B65G 47/82* (2006.01)
*B65G 61/00* (2006.01)

(52) U.S. Cl.
USPC ............ 198/602; 198/741; 198/743; 198/617

(58) Field of Classification Search
None
See application file for complete search history.

(56) References Cited

U.S. PATENT DOCUMENTS

| 3,859,772 | A | | 1/1975 | Thierion |
| 3,987,889 | A | * | 10/1976 | Godoy ......................... 198/429 |
| 8,499,923 | B2 | * | 8/2013 | Kronawitter et al. ......... 198/617 |
| 8,534,453 | B2 | * | 9/2013 | Liebhardt et al. ............. 198/748 |

FOREIGN PATENT DOCUMENTS

| DE | 19549454 A1 | 8/1997 |
| DE | 10162282 A1 | 7/2003 |
| EP | 0387152 A1 | 9/1990 |
| EP | 0876957 A1 | 11/1998 |
| EP | 187488 A1 | 10/2007 |
| FR | 2219061 A1 | 9/1974 |
| GB | 2452996 A1 | 3/2009 |

OTHER PUBLICATIONS

EP Search Report for EP 11157029 dated Aug. 4, 2011.

* cited by examiner

*Primary Examiner* — Kavel Singh
(74) *Attorney, Agent, or Firm* — Brinks Gilson & Lione

(57) ABSTRACT

The device for channeling out upright containers from a first transport device, which moves the container in a transport direction, includes a lateral guide section, which extends in the transport direction, and a gripper unit, which has a plurality of grippers for gripping the containers. The lateral guide section and the gripper unit are moved from a pickup position for the containers jointly in a direction transverse to the transport direction. After this joint movement the gripper unit is moved towards a discharge position for the containers. The lateral guide section and the gripper unit are then moved back to the pickup position.

7 Claims, 8 Drawing Sheets

DEVICE FOR CHANNELING OUT CONTAINERS

RELATED APPLICATIONS

The present patent document claims the benefit of priority to European Patent Application No. EP 11157029.7, filed Mar. 4, 2011, and entitled "DEVICE FOR CHANNELING OUT CONTAINERS" the entire contents of each of which are incorporated herein by reference.

FIELD AND BACKGROUND

The present invention relates to a device and a method for channeling upright containers out from a transport device.

These types of devices for channeling out containers are used when upright containers are to be transferred from an intermittently operating transport device to a following accumulator or a continuously operating second transport device. In the pharmaceutical industry, these devices are used in particular when containers such as small bottles or cans filled with tablets, capsules, or sugar-coated pills are to be transferred from the filling and sealing station to another transport device after they have been filled and sealed with a cap. There are a number of different ways in which devices of this type for channeling out upright containers can be designed.

It is important for quality control that only "good" containers, that is, containers which have been filled correctly as shown by a preceding inspection, are transferred to the transport device which carries them on for further processing, whereas, even if a malfunction occurs with the channeling-out of the good containers, all of the containers judged to be "bad" will continue to travel straight ahead and can thus be easily rejected. This active channeling-out of the good containers provides 100% certainty that only good containers are put on sale.

BRIEF SUMMARY

It is an object of the present invention to provide a device for channeling out upright containers classified as "good" from a transport device, which device for channeling is not susceptible to breakdown and which delivers the containers at a high transfer rate. It is another object of the present invention to provide a respective method for channeling out the containers.

According to an aspect of the invention, the method for channeling out upright containers from a first transport device, which moves the containers intermittently in a transport direction, comprises:
  providing a lateral guide section extending in the transport direction;
  providing a gripper unit comprising a plurality of grippers for gripping the containers;
  moving the lateral guide section and the gripper unit substantially jointly from a pickup position for the containers transversely to the transport direction;
  moving the gripper unit in the transport direction to a discharge position for the containers;
  moving the lateral guide section transversely to the transport direction back to the pickup position; and
  moving the gripper unit opposite the transport direction and then transversely to the transport direction back to the pickup position.

This method ensures an especially fast and reliable transfer of containers, wherein, through the active channeling-out of containers classified as "good", the further processing of unsuitable containers can be ruled out with certainty even if the device malfunctions.

According to another aspect of the invention, the device for channeling out upright containers from a first transport device comprises a lateral guide section, which extends in the transport direction of the containers in the first transport device, and a gripper unit, which comprises a plurality of grippers for gripping the containers. The lateral guide section can be moved by a first drive transversely to the transport direction, and the gripper unit can be moved both by a second drive transversely to the transport direction and by a third drive in and opposite to the transport direction.

In this way, the containers can be supplied quickly and reliably to the further processing stations, wherein it is impossible for a container classified as "bad" to be sent on for further processing.

The first drive for the lateral guide section and the second drive for the gripper unit are preferably actuated in such a way that the lateral guide section and the gripper unit are moved substantially jointly from a pickup position in the direction transverse to the transport direction. In this way, the lateral guide section, which is still needed as a lateral boundary element for container transport during the transport of the containers in the first transport device, is moved easily out of the path of the gripper unit without any loss of time.

The third drive is preferably actuated in such a way that, during or after the transverse movement of the lateral guide section and the gripper unit, the gripper unit is moved in the transport direction to a discharge position for the containers. In this way, the movement of the gripper unit is easily disconnected from the movement of the lateral guide section, and the containers are sent parallel to the first transport device but offset from it to the further processing stations. If the third drive is actuated while the gripper unit is still being moved transversely by the second drive, the gripper unit travels along a curved path.

The device preferably comprises, in the area of the discharge position, a second transport device for accepting the containers supplied by the gripper unit. The second transport device is preferably driven continuously in the transport direction, and the third drive is preferably actuated in such a way that the speed at which the gripper unit is traveling in the transport direction when in the discharge position is substantially the same as the speed of the second transport device. It is thus possible to deposit the containers onto the continuously moving second transport device without the danger that they will tumble or fall over on the second transport device because of a significant difference between the speed of the gripper unit and the speed of the second transport device.

The first drive is preferably actuated in such a way that, after the gripper unit has been moved in the transport direction to the discharge position, the lateral guide section is moved back again transversely to the transport direction into the pickup position. In this way, the lateral guide section can very quickly fulfill its actual function again as a support element in the first transport device for the following containers, whereas the containers already picked up by the gripper unit are still in the process of being transferred to the second transport device.

The second and third drives are also preferably actuated in such a way that, after or during the movement of the lateral guide section back to the pickup position, the gripper unit is moved back opposite the transport direction and then moved transversely to the transport direction into the pickup position. Thus the circuit is closed again, and the gripper unit can pick up the next group of containers.

To ensure that the lateral guide section provides optimal support for containers of different sizes, the gripper unit, when in the pickup position, preferably projects through a horizontal slot in the lateral guide section. Thus containers of many different sizes can be reliably gripped, whereas at the same time the containers are supported by two rails, one above the slot and the other below it, during the operation of the first transport device.

To guarantee that the sequence of movements can be carried out precisely, the first, second, and third drives are preferably servo motors.

In an advantageous embodiment, the first drive is connected to the lateral guide section by a spindle arranged transversely to the transport direction. As a result, the overall construction requires an extremely small amount of space for the movement of the lateral guide section in the transport direction.

The second drive is preferably connected to the gripper unit by a belt drive extending transversely to the transport direction.

To easily superimpose the movements of the gripper unit in two directions, the gripper unit and the second drive are preferably attached to a slide, which can be moved by a third drive in and opposite to the transport direction. It is advantageous here for the third drive to be connected to the slide by a belt drive extending parallel to the transport direction.

BRIEF DESCRIPTION OF THE DRAWINGS

Additional features and advantages of the present invention can be derived from the following description, which refers to the drawings.

DETAILED DESCRIPTION OF SPECIFIC EMBODIMENTS

Figure 1:
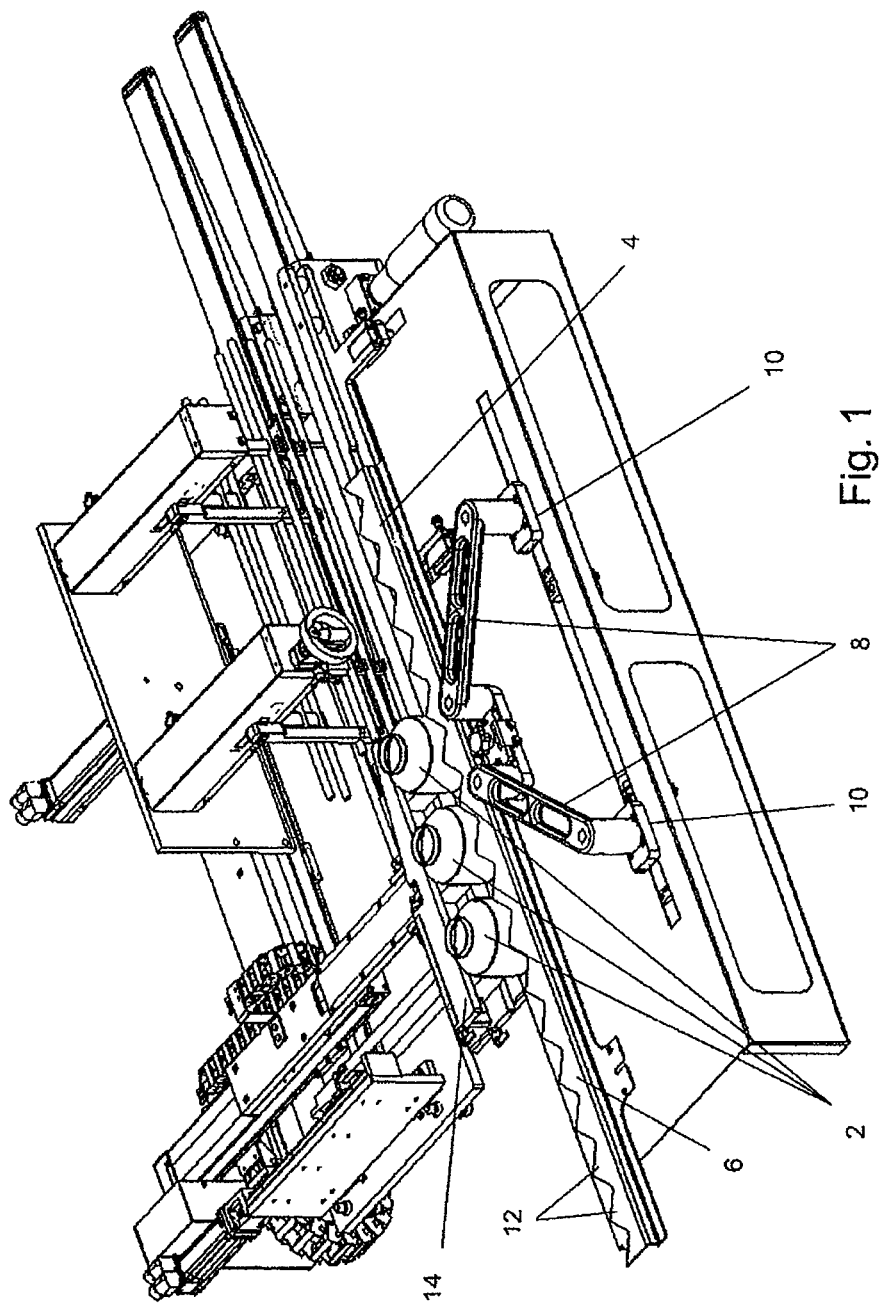
FIG. 1 is a perspective view of one embodiment of the device for channeling out upright containers with the containers in a pickup position.
Figure 2:
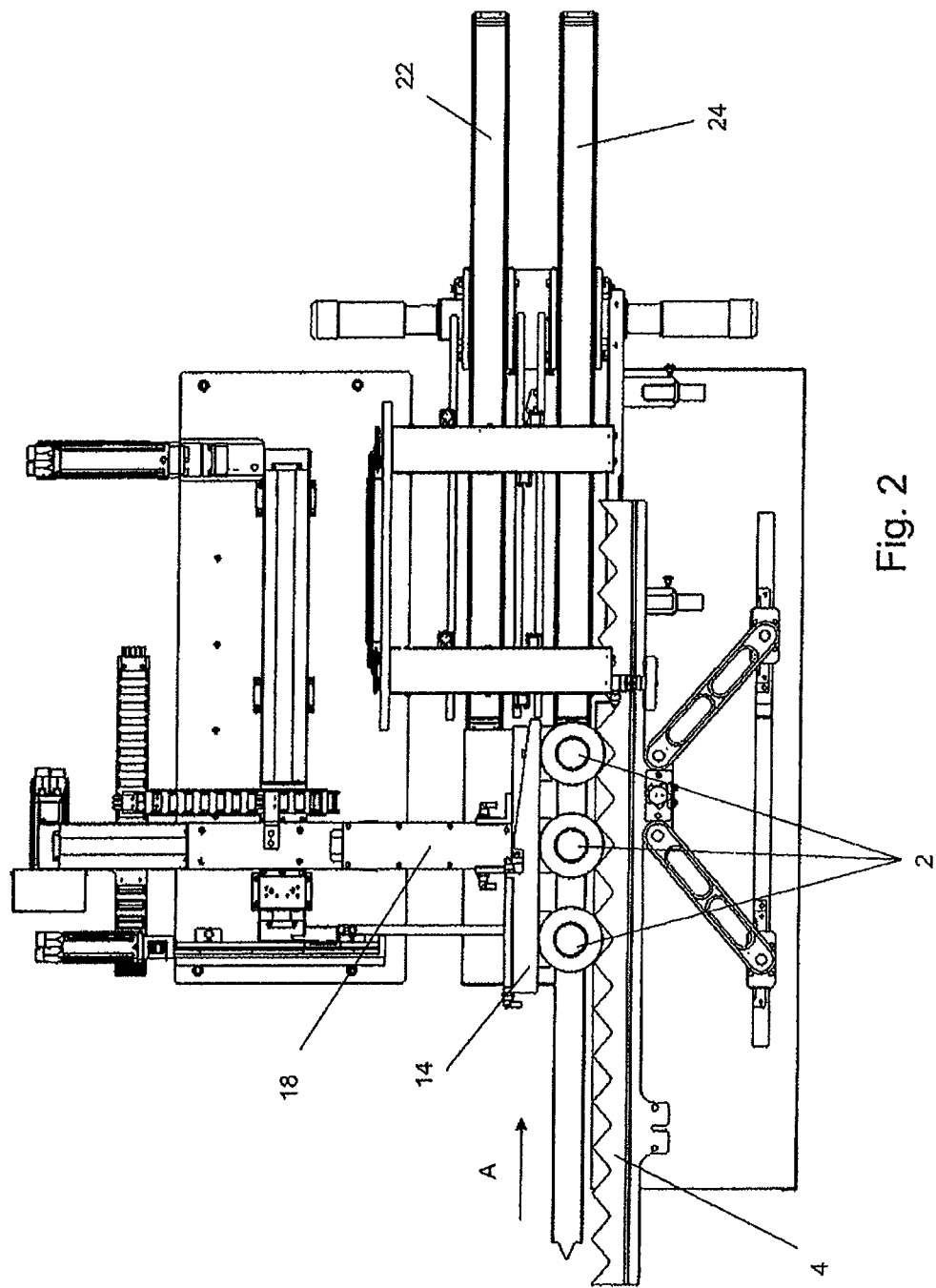
FIG. 2 is a plan view of the arrangement of FIG. 1.

FIGS. 1 and 2 show a device for channeling out upright containers 2, which is in the position in which it picks up the containers 2.

The containers 2 were previously carried by a first transport device 4, preferably intermittently, to the illustrated transfer position which corresponds to the pickup position of the device for channeling out the containers 2.

In the example shown here, the first transport device 4 consists of a rake conveyor 6, which is supported so that it can shift back and forth both in the transport direction A of the containers 2 and also transversely to this transport direction. The shifting of the rake conveyor 6 in the transport direction and transversely to the transport direction takes place preferably by way of several pairs of arms 8 (only one pair is shown in each of FIGS. 1 and 2), which are rotatably supported on the rake conveyor 6, wherein each pair of arms 8 forms a V-shape opening away from the rake conveyor 6. At the end facing away from the rake conveyor 6, each arm 8 of a pair is rotatably connected to a shifting element 10. The shifting elements 10 of the left arms 8 and the shifting elements 10 of the right arms 8 of the arm pairs are movable independently of each other by actuation of their own drives (not shown). By the uniform movement in the same direction of the two arms 8 of each pair, the rake conveyor 6 can be moved back and forth in the transport direction A, whereas, by movement of the shifting elements 10 of an arm pair away from or toward each other, the rake conveyor 6 can be moved back and forth transversely to the transport direction.

During transport, part of the circumference of each container 2 is held in one of the V-shaped or U-shaped recesses 12 in the rake conveyor 6 and is carried along in the transport direction A as the rake conveyor 6 moves forward. For this purpose, it is necessary for an opposing support element for the containers 2 to be set up on the side opposite the rake conveyor 6, so that the containers remain pressed into the recesses 12 as the rake conveyor 6 moves in the transport direction A and cannot escape to the side. Only a rear lateral guide section 14 of this opposing support element is shown in the figures, this section already forming a component of the device for channeling out the containers 2.

Figure 7:
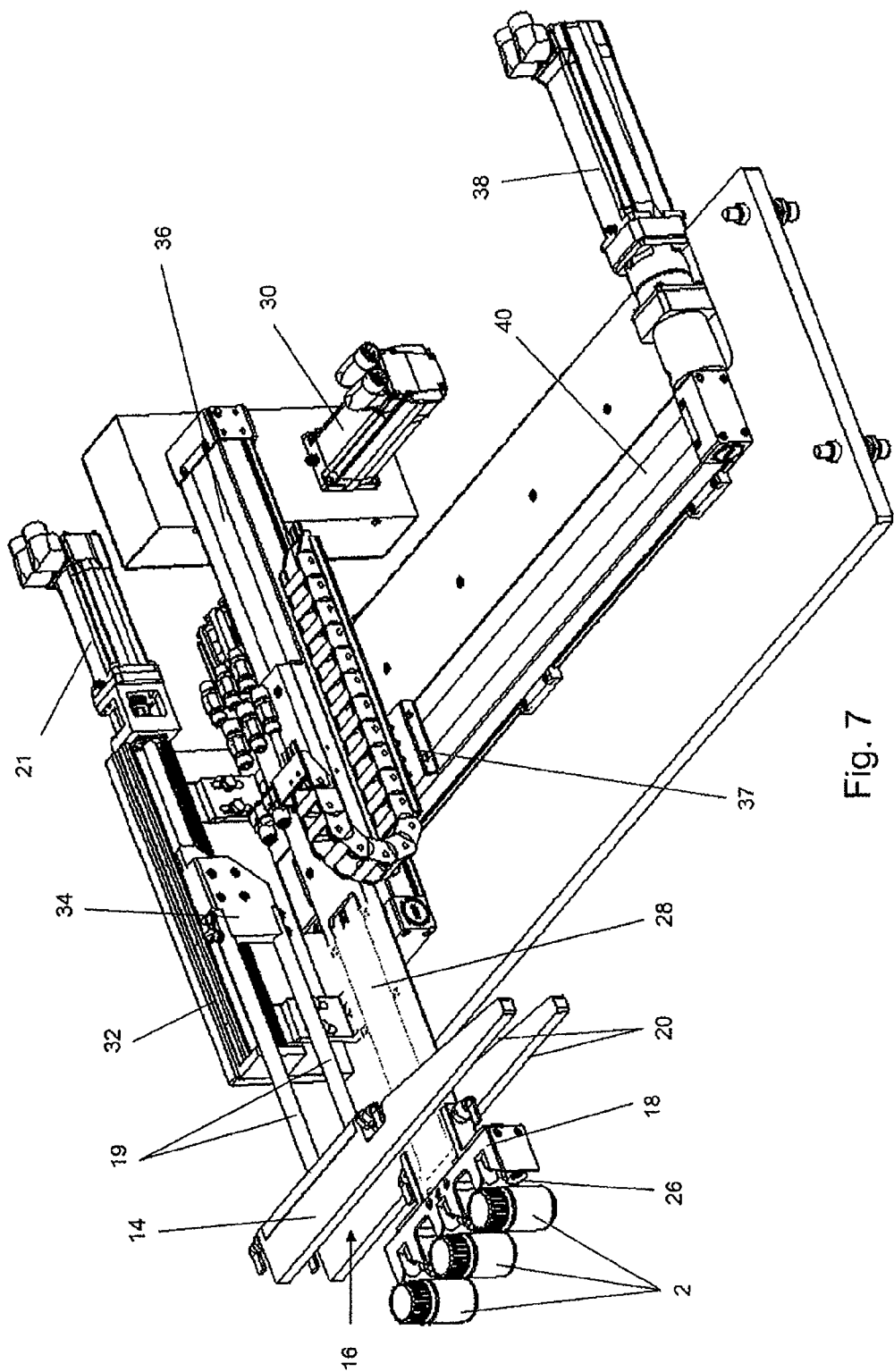
FIG. 7 is a detailed, perspective view of a preferred design of the drives of the device for channeling out upright containers.

As can be seen best in FIG. 7, the lateral guide section preferably comprises a horizontal slot 16, through which a gripper unit 18 projects when the containers 2 are in the pickup position. The slot 16 is open to the outside at least in a rear area of the lateral guide section 14 and makes it possible for the gripper unit 18 to move in the transport direction A out of the area of the lateral guide section 14. The containers 2 are supported in the lateral guide section 14 by two rails 20, one extending above, the other below the slot 16, the surface of these rails facing the containers 2 being as smooth and frictionless as possible. With this arrangement of the slot 16 and the two rails 20, a large number of containers of different sizes can be gripped reliably by the gripper unit 18, whereas at the same time the containers 2 are supported by the rails 20 during the operation of the first transport device 4.

It is also conceivable that, for containers of a certain shape, the lateral guide section 14 extending in the transport direction would not comprise a slot 16, and the gripper unit 18 could extend above or below the lateral guide section 14.

The lateral guide section 14 is connected to a first drive 21 by two connecting rods 19 attached to one side or by some other type of connecting element. The drive is responsible for moving the lateral guide section 14 back and forth transversely to the transport direction A.

In the example shown here, the first drive 21 is designed as a servo motor, and it drives a spindle 32 extending transversely to the transport direction A. The spindle is mounted with freedom to shift back and forth on a base element 34, which is connected in turn to the connecting rods 19. There are numerous other ways in which the lateral guide section 14 and its drive can be designed so that it can move back and forth transversely to the transport direction.

On the right side of FIG. 2, a second transport device 22 is shown, which is offset from the first transport device 4 and which carries the containers further onward in the transport direction A after they have been channeled out. In the exemplary embodiment shown here, the second transport device 22 is a continuously operating, endless conveyor belt, on which the containers 2 are deposited by the gripper unit 18.

This means that only when the device for channeling out the containers 2 is activated do the containers 2 arrive on the second transport device 22, which then conveys the containers 2 onward for further processing. Containers 2 which have been identified as "bad", however, are not gripped by the gripper unit 18 and thus are not shifted laterally onto the second transport device 22. Instead, they continue to be carried forward in a straight line and arrive on an ejection path 24. It is thus guaranteed that, even if the device for channeling out containers 2 should break down, no containers 2 classified as "bad" can be sent on for further processing.

As can be seen best again in FIG. 7, the gripper unit 18 comprises several grippers 26, which are preferably vacuum-operated. Mechanical grippers can also be used. The grippers 26 are preferably actuated independently of each other and are connected to a second drive by a common connecting rail 28 or some other type of connecting element; the drive is responsible for moving the gripper unit 18 back and forth transversely to the transport direction A.

The second drive 30 responsible for the back-and-forth movement of the gripper unit 18 transversely to the transport direction A is preferably also designed as a servo motor, which, in the example shown here, transfers motion by means of a belt drive 36, which extends transversely to the transport direction A, to the connecting rail 28 attached to this belt drive. Here, too, there are alternative ways in which the gripper unit 18 can be moved back and forth transversely to the transport direction A.

The important point is that, to form a compound slide, all of the components responsible for moving the gripper unit 18 transversely to the transport direction A are mounted on a slide 37, which can itself be shifted in and opposite to the transport direction A by means of a third drive 38, preferably again a servo motor. For this purpose, a belt drive 40 can again connect the third drive 38 to the slide 37, wherein the belt drive 40 in this case runs parallel to the transport direction A.

As shown in FIG. 7, the gripper unit 18 can project so far beyond the lateral guide section 14 that the connecting rail 28 is in the area of the slot 16. It is also possible, however, for only the grippers 26 to extend slightly out of the slot 16.

The device for channeling out containers 2 can be used not only with the rake conveyor 6 shown but also in combination with other first transport devices 4 where a lateral guide section 14 for the containers 2 is possible.

In the following, the way in which the device works is explained in detail. As previously mentioned, the containers 2 shown in FIGS. 1 and 2 are in a starting position for the actuation of the device for channeling out containers 2. Both the lateral guide section 14 and the gripper unit 18 are in the pickup position for the containers 2. The grippers 26 are activated and grip the corresponding number of containers 2, three containers in the present case.

The first drive 21 for the lateral guide section 14 and the second drive 30 for the gripper unit 18 are now actuated in such a way that the lateral guide section 14 and the gripper unit 18 are moved jointly out of the pickup position for the containers 2, either simultaneously or with a slight time offset, transversely to the transport direction A.

Figure 3:
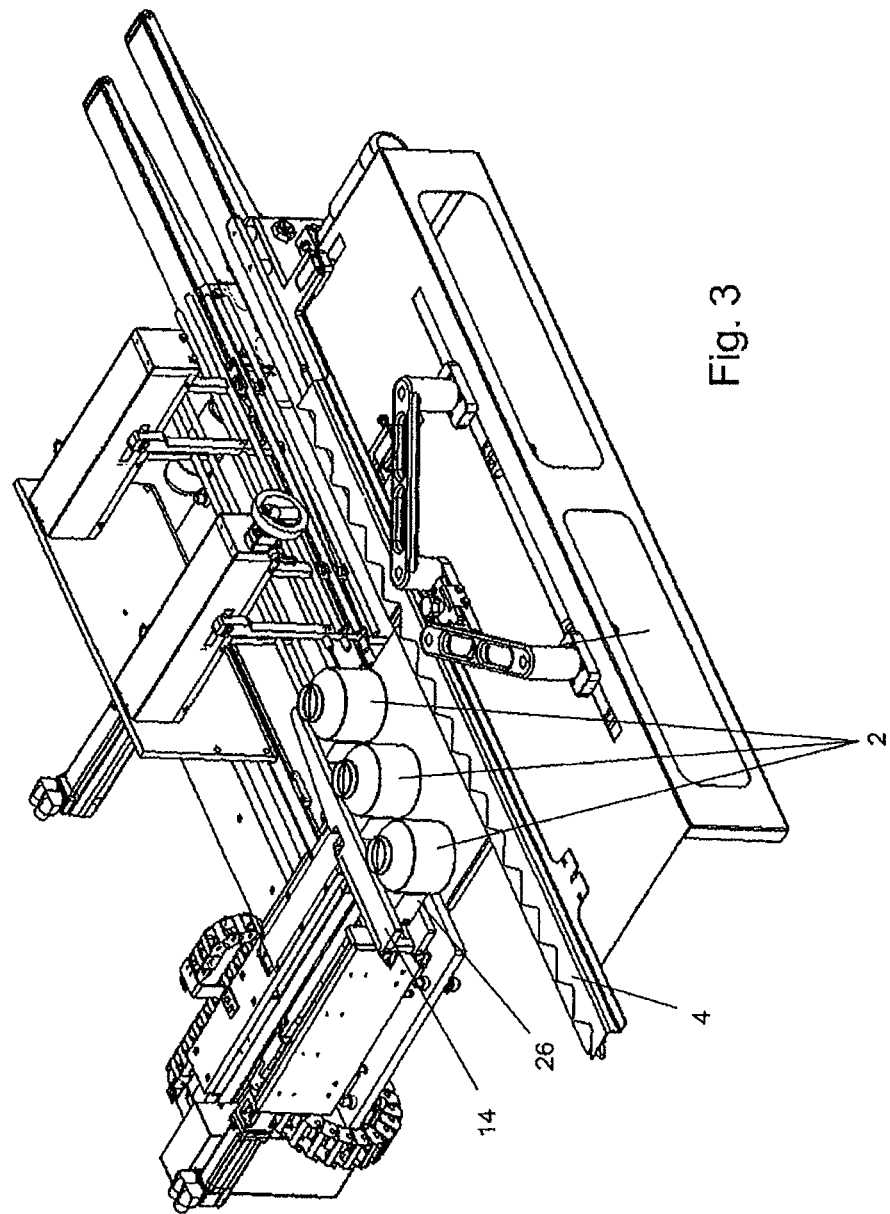
FIG. 3 is a perspective view of the embodiment of FIG. 1 after the lateral guide section and the gripper unit have both been pulled back.
Figure 4:
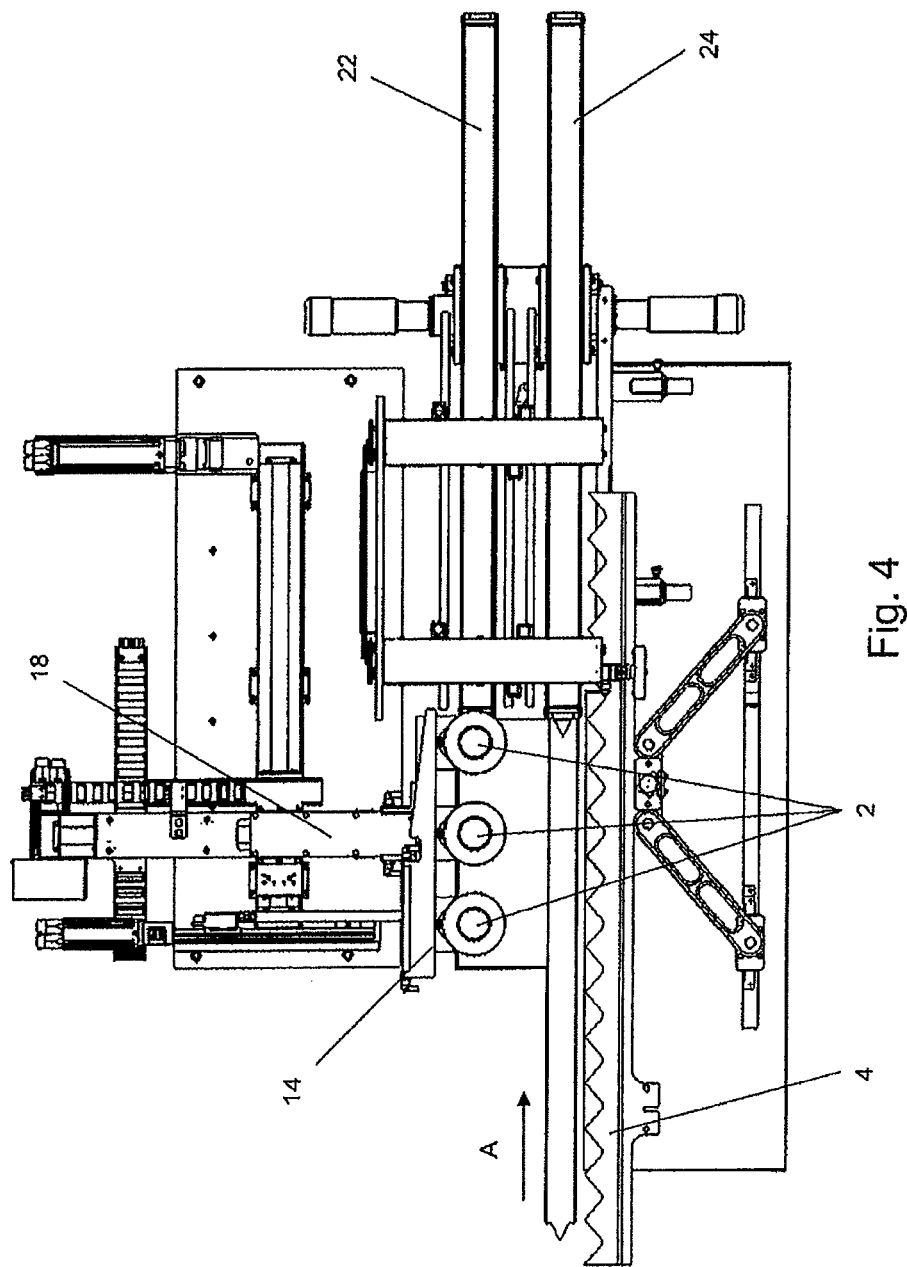
FIG. 4 is a plan view of the arrangement of FIG. 3.
Figure 5:
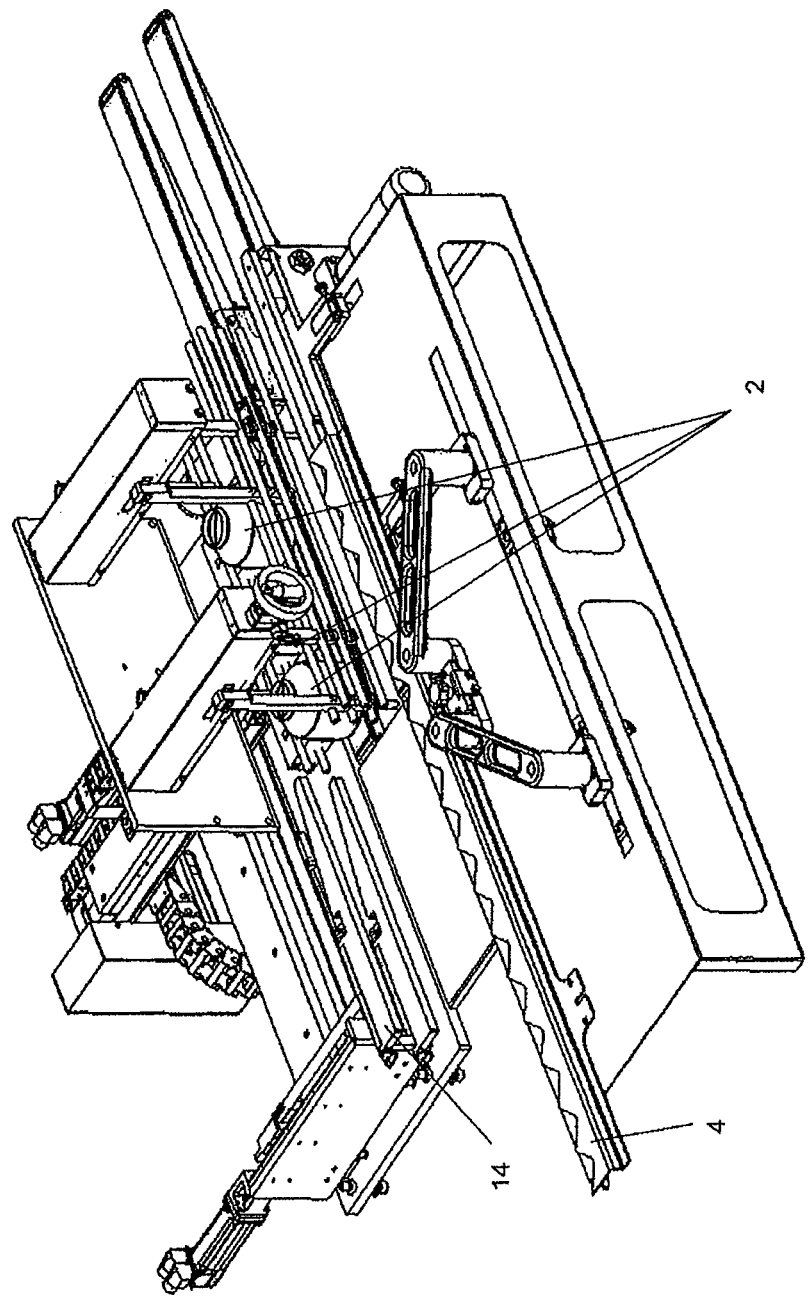
FIG. 5 is a perspective view of the embodiment of FIG. 1, in which the gripper unit is in a discharge position for the containers.
Figure 6:
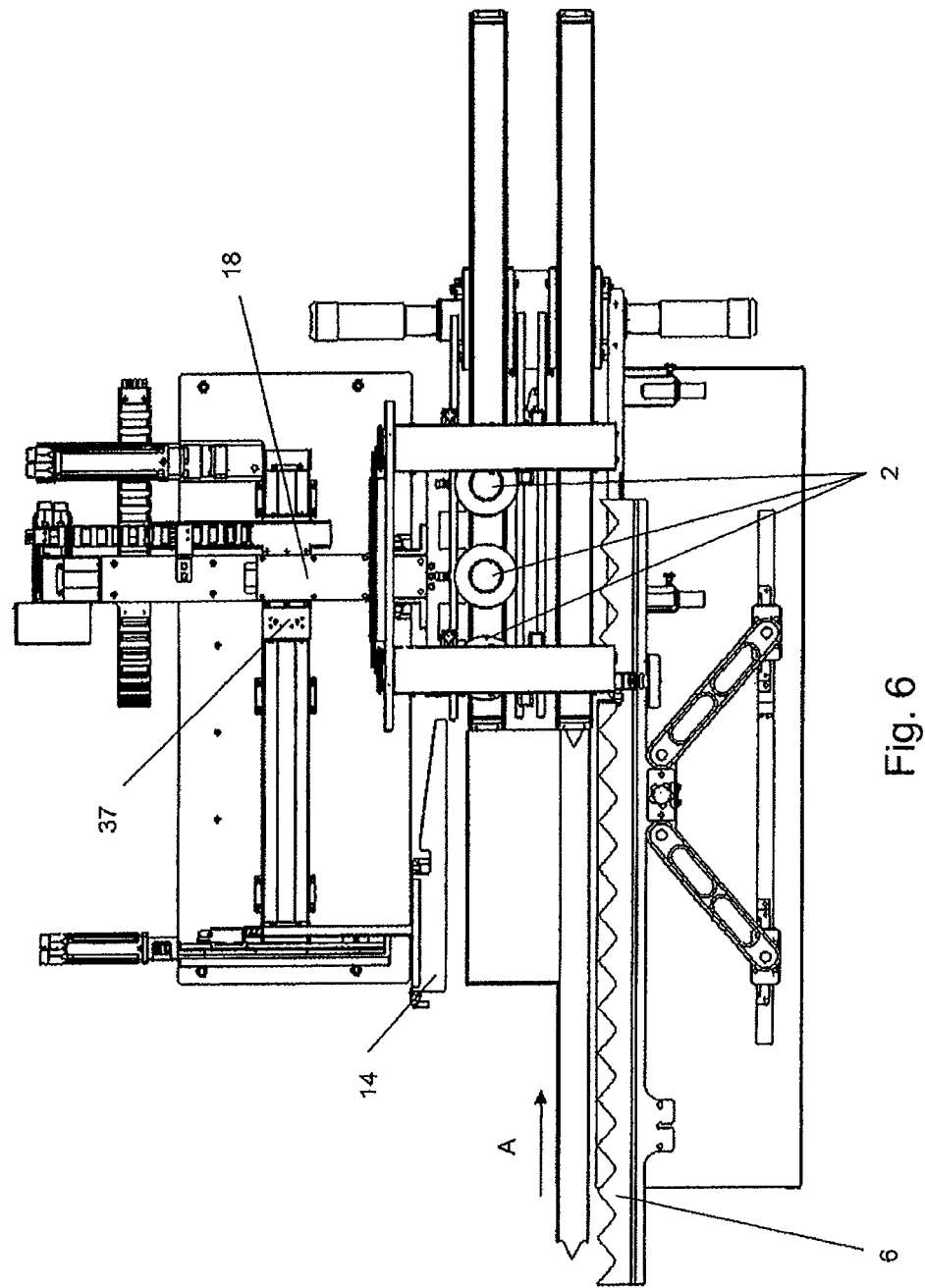
FIG. 6 is a plan view of the arrangement of FIG. 5.

The result of this movement is shown in FIGS. 3 and 4. Starting from this position, the third drive 38 is now actuated in such a way that, after the transverse movement of the lateral guide section 14 and of the gripper unit 18, the gripper unit 18 alone is now moved in the transport direction A into a discharge position for the containers 2. This position is illustrated in FIGS. 5 and 6. It is also possible for the third drive 38 to be actuated while the transverse displacement is still taking place, with the result that the gripper unit travels along a curved path.

In the discharge position, the containers 2 are transferred to the second transport device 22. The transfer preferably takes place while the gripper unit 18 is still moving, that is, while it is moving at the same or a slightly different speed in the transport direction A as the second transport device 22. In this way, the containers 2 are prevented from tumbling or falling over as a result of too great a speed difference when they are deposited onto the second transport device 22. During this transfer operation, the gripper unit 18 must also be moved back slightly in the direction transverse to the transport direction A so that it releases the containers 2 completely.

To save time, first the lateral guide section 14 is moved from the position shown in FIGS. 5 and 6 transversely to the transport direction A back into the pickup position. This can be done while the containers 2 are still being transferred by the gripper unit 18 to the second transport device 22 or even before this transfer. The only important point here is that the containers 2 gripped by the gripper unit 18 must have been conveyed completely out of the area of the lateral guide section 14 in the transport direction A before the return movement of the lateral guide section 14. Once that is done, the lateral guide section 14 can be moved back again into the pickup position, where it will already be serving its actual function as an opposing support element for the next containers 2 being brought up by the first transport device 4.

Immediately after the containers 2 have been transferred to the second transport device 22, the second and third drives 30, 38 are actuated, so that, after or during the movement of the lateral guide section 14 back to the pickup position, the gripper unit 18 is also moved back opposite to the transport direction A and then transversely to the transport direction A into the pickup position again. Thus the channeling-out cycle can begin again from the beginning. The typical length of a cycle of this type is just over 1 second.

Figure 8:
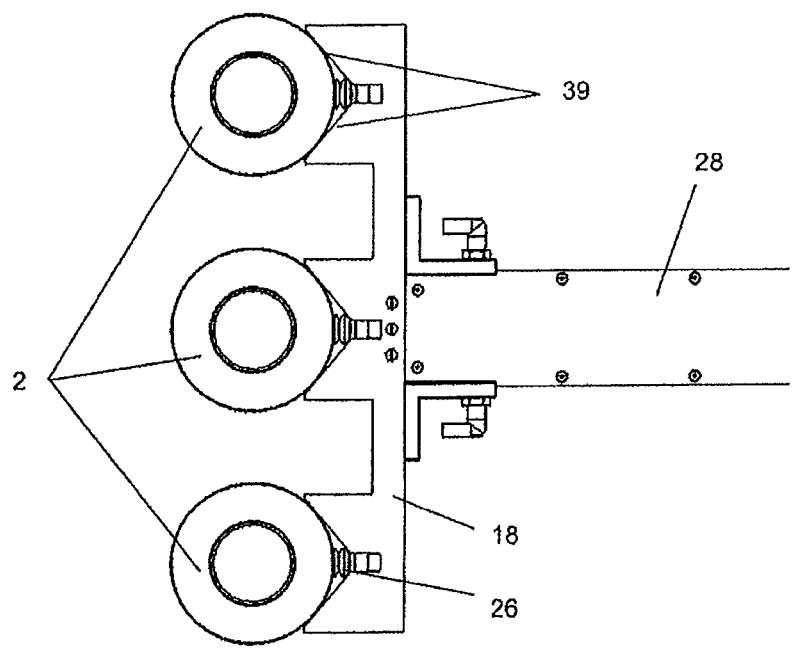
FIG. 8 is a detailed view of the gripper unit.

FIG. 8 shows details of the grippers 26. Each vacuum-operated gripper preferably comprises substantially triangular receiving elements 39, for example recesses, which widen out toward the outside, so that containers of different sizes and shapes can be accommodated. Through the combination of vacuum suction and triangular receiving elements 39, the containers 2 can be transferred reliably to the second transport device 22.

The invention claimed is:

1. A method for channeling out upright containers from a first transport device, which moves the containers intermittently in a transport direction, the method comprising:
   providing a lateral guide section extending in the transport direction;
   providing a gripper unit comprising a plurality of grippers for gripping the containers;
   moving the lateral guide section and the gripper unit substantially jointly from a pickup position for the containers transversely to the transport direction;
   thereafter moving the gripper unit in the transport direction to a discharge position for the containers;
   moving the lateral guide section transversely to the transport direction back to the pickup position while the containers are still being transferred by the gripper unit in the transport direction; and
   moving the gripper unit opposite the transport direction and then transversely to the transport direction back to the pickup position.

2. The method of claim 1 wherein the step of moving the gripper unit in the transport direction to the discharge position for the containers is performed during or after the transverse movement of the lateral guide section and of the gripper unit from the pickup position.

3. The method of claim 2 wherein a second transport device for accepting the containers supplied by the gripper unit is provided in an area of the discharge position.

4. The method of claim 3 wherein the second transport device is driven continuously in the transport direction, and wherein a speed of the movement of the gripper unit in the transport direction when in the discharge position is substantially the same as a speed of the second transport device.

5. The method of claim 4 wherein, after the gripper unit has been moved forward in the transport direction to the discharge position, the lateral guide section is moved back again transversely to the transport direction to the pickup position.

6. The method of claim 5 wherein the step of moving the gripper unit opposite the transport direction and then transversely to the transport direction back to the pickup position is performed after or during the movement of the lateral guide section back to the pickup position.

7. The method of claim 3, wherein the step of moving the lateral guide section transversely to the transport direction back to the pick-up position occurs while the containers are still being transferred by the gripper unit to the second transport device.

* * * * *